No. 824,468. PATENTED JUNE 26, 1906.
E. J. CALLEY.
SYRUP DISPENSING JAR.
APPLICATION FILED JUNE 3, 1905.
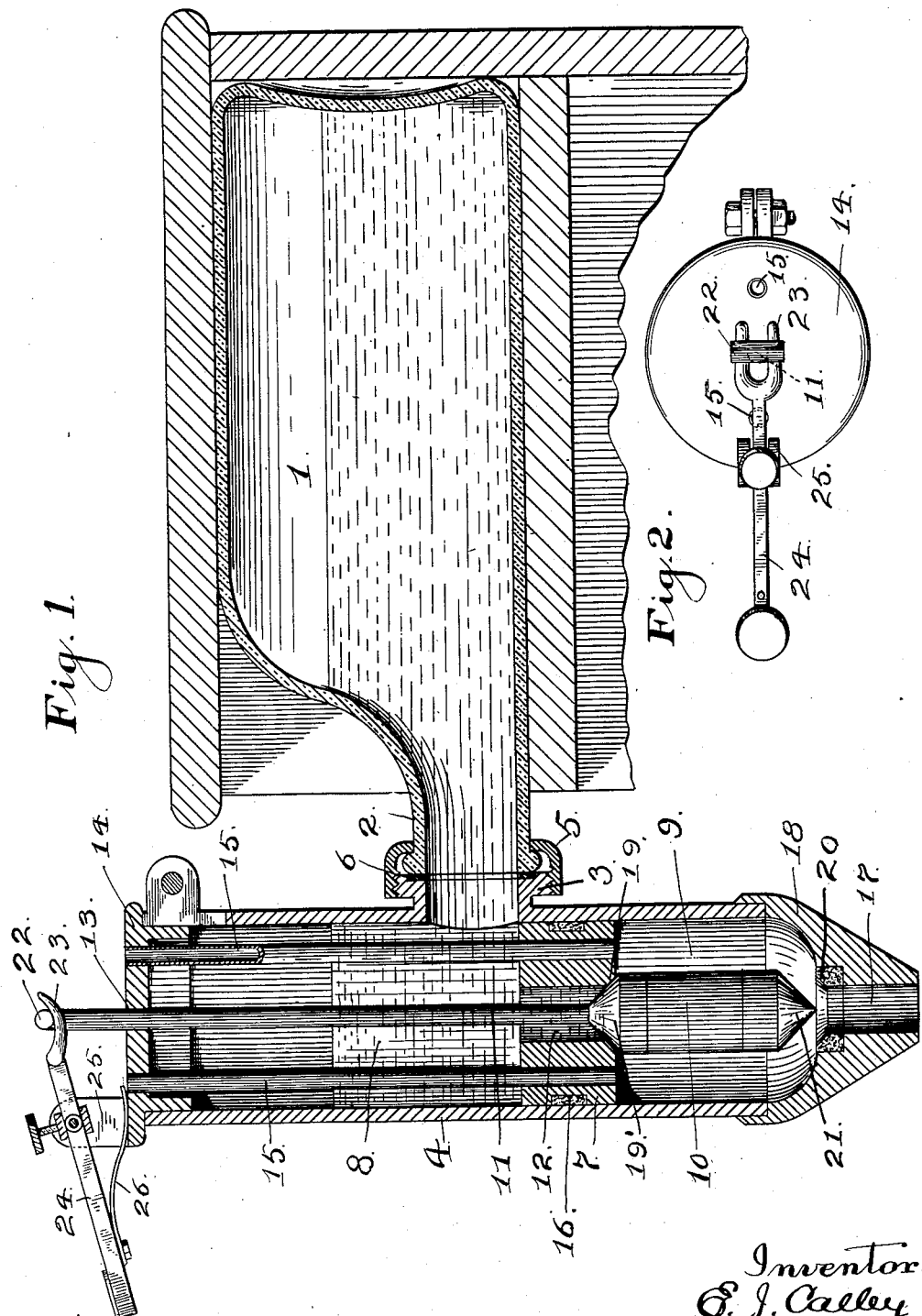
Witnesses:
Arthur L. Lee
Thos. R. Heath
Inventor.
E. J. Calley
by N. A. Acker
Atty.

UNITED STATES PATENT OFFICE.

ELIAS J. CALLEY, OF SAN FRANCISCO, CALIFORNIA.

SYRUP-DISPENSING JAR.

No. 824,468.  Specification of Letters Patent.  Patented June 26, 1906.

Application filed June 3, 1905. Serial No. 263,628.

*To all whom it may concern:*

Be it known that I, ELIAS J. CALLEY, a citizen of the United States, residing in the city and county of San Francisco, State of California, have invented certain new and useful Improvements in Syrup-Dispensing Jars; and I hereby declare the following to be a full, clear, and exact description of the same.

The invention relates to that class of jars or receptacles for the holding of syrup or fruit juices for use in connection with soda-water fountains, the object of the invention being to provide a self-measuring jar, whereby a uniform quantity of the retained syrup or fruit-juice is discharged into the soda-water glass each time the controlling-valve is raised or unseated to open the discharge or outlet port, thereby overcoming the necessity of the operator or attendant having charge of the soda-water fountain having to measure by the eye the quantity of syrup or fruit-juice discharged from the jar into the glass placed to receive the same.

To comprehend the invention, reference should be had to the accompanying sheet of drawings, wherein—

Figure 1 is a vertical sectional view, in side elevation, disclosing the syrup-holding jar or receptacle as located beneath an ordinary serving-counter, the controlling-valve being illustrated in a raised position to open the outlet-port of the gage or measuring chamber, and Fig. 2 is a top plan view of the receiving-reservoir connected to the open discharge end of the holding jar or receptacle.

The numeral 1 designates any suitable form of a syrup jar or receptacle, which in the present case is formed with a reduced outlet-neck 2. This neck is connected to a projecting boss 3 of the vertically-disposed receiver 4 by means of the coupling-ring 5, there being interposed between the neck 2 and boss 3 an elastic packing-ring 6. By this means a tight joint is formed between the said parts, and leakage thus prevented.

The receiver 4 is divided by the diaphragm 7 into a receiving-chamber 8 and a gage or measuring chamber 9, there being a direct connection between the said receiving-chamber and the jar or receptacle 1, the body of liquid contained in the said jar or receptacle flowing by gravity into and partly filling the said receiving-chamber 8.

Within the gage or measuring chamber 9 works the vertically-movable valve 10, the stem 11 of which extends through the feed-port 12, forming communication between the receiving-chamber 8 and the gage or measuring chamber 9, the upper end portion thereof extending through a guide-opening 13 in the cap 14 for the receiver 4.

The diaphragm 7 is held in position by means of the vertical tubes 15, leakage between the said diaphragm and the wall of the receiver being prevented by the packing-ring 16. I preferably employ several of the tubes 15 to facilitate the insertion and withdrawal of the diaphragm, said tubes being separated, as shown, serving to maintain the diaphragm in substantially true horizontal position. The tubes 15 extend through the diaphragm 7, thus acting as vent-tubes for admitting atmospheric pressure to the gage or measuring chamber 9 to expedite the discharge of the liquid therefrom when the outlet-port 17 thereof is opened. The outlet-port 17 is formed in the bottom cap 18, which cap screws onto the lower end of the receiver 4 and serves as a removable bottom therefor.

The lower end of the feed-port 12 is preferably enlarged or flared, so as to provide an inclined circular seat 19 for the tapered upper end 19' of the valve 10, while the upper end of the outlet-port 17 is similarly flared to form a seat 20 for the lower tapered end 21 of the said valve 10.

The head 22 of the valve-stem 11, outside of the receiver 4, is engaged by the inner end 23 of the lever 24, which lever is fulcrumed to the standard 25, upwardly projecting from the cap 14. The free end of this lever is normally held upward by the pressure of the spring 26, although in Fig. 1 of the drawings the said lever is illustrated depressed or in the position it assumes when moved to raise or unseat the valve 10 to open the outlet-port 17 and close the feed-port 12 against the admission of liquid from the receiving-chamber 8 into the gage or measuring chamber 9. When the valve stands in this position, the liquid or charge of syrup escapes from within the said gage or measuring chamber 9. The moment the said chamber has emptied itself the person attending to the drawing of the syrup releases the lever 24, when the same is forced upward and the valve 10 lowered to close the outlet-port 17. This movement of the said valve 10 uncovers or opens the feed-port 12, permitting the liquid or syrup contained within the receiving-chamber 8 to flow into and recharge the gage or measuring chamber 9, while the air from said measuring-chamber will ascend into the syrup-jar and receiving-chamber. The size of the gage or measuring chamber 9 is such as to hold the proper quantity of syrup for one glass of soda-water. Hence the valve 10 should be held raised and the outlet-port 17 maintained opened until the said chamber 9 has emptied itself. By providing the receiving-chamber connected with the measuring-chamber as disclosed herein, it will be appreciated that the device may be readily applied to syrup-jars supported and lying flat in a cooling receptacle or rack and also overcomes any necessity of applying valve mechanism at the mouth of the jar.

Having thus described the invention, what is claimed as new, and desired to be protected by Letters Patent, is—

1. In a device of the character described, receiving and measuring chambers formed of a hollow casing divided by a removable partition inserted thereinto, a packing interposed between the edge of the partition and the inner surface of the tubular casing, an outlet from the measuring-chamber, a communicating passage in the partition leading from the receiving-chamber to the measuring-chamber and a valve device for alternately closing and opening the said outlet and communicating passage.

2. In a device of the character described, receiving and measuring chambers formed of a hollow casing divided by a removable partition inserted thereinto, a detachable cap at one end of the casing carrying said partition and by which the latter may be inserted into or withdrawn from the casing, an outlet from the measuring-chamber, and a valve in said measuring-chamber adapted by its movement in opposite directions to alternately open and close the outlet from the measuring-chamber and the communicating passage between said chamber and the receiving-chamber.

3. In a device of the character described, receiving and measuring chambers formed of a hollow casing divided by a removable partition inserted thereinto, a detachable cap at one end of the casing carrying said partition and whereby the latter may be inserted into or withdrawn from the casing, the connecting means therebetween including a vent-tube opening to the measuring-chamber and to the exterior of the casing, an outlet from the measuring-chamber, and a valve in said measuring-chamber adapted by its movement in opposite directions to alternately open and close the outlet from the measuring-chamber and the communicating passage between said chamber and the receiving-chamber.

4. In a device of the character described, receiving and measuring chambers formed of a hollow casing divided by a removable partition inserted thereinto, a detachable cap at one end of the casing carrying said partition, an outlet from the measuring-chamber, and a valve in said measuring-chamber adapted by its movement in opposite directions to alternately open and close the outlet from the measuring-chamber and the communicating passage between said chamber and the receiving-chamber and means for operating said valve mounted upon and removable with said cap.

5. In a device of the character described, receiving and measuring chambers formed of a hollow casing divided by a removable partition inserted thereinto, a detachable cap at one end of the casing carrying said partition, the connecting means therebetween including a vent-tube opening to the measuring-chamber and to the exterior of the casing, an outlet from the measuring-chamber, and a valve in said measuring-chamber adapted by its movement in opposite directions to alternately open and close the outlet from the measuring-chamber and the communicating passage between said chamber and the receiving-chamber and means for operating said valve mounted upon and removable with said cap.

6. In a device of the character described, receiving and measuring chambers formed of a hollow casing divided by a removable partition therein, a cap at the upper end of the casing, a detachable cap at the lower end of the casing having a valve-seat surrounding an outlet therethrough, a passage in the partition connecting the receiving and measuring chambers, a valve device in the measuring-chamber adapted to alternately open and close the said passage in the partition and the outlet in the lower cap, and means mounted in the upper cap for actuating said valve device.

In testimony whereof I have hereunto set my hand.

ELIAS J. CALLEY.

Witnesses:
N. A. ACKER,
D. B. RICHARDS.